United States Patent
Imamura et al.

(10) Patent No.: US 6,790,550 B2
(45) Date of Patent: Sep. 14, 2004

(54) WATER CONTROL FOR A FUEL CELL SYSTEM

(75) Inventors: Tomonori Imamura, Kariya (JP); Toshiyuki Kawai, Okazaki (JP); Haruhiko Kato, Anjo (JP); Kunio Okamoto, Okazaki (JP)

(73) Assignee: Denso Corporation, Kariya (JP)

( * ) Notice: Subject to any disclaimer, the term of this patent is extended or adjusted under 35 U.S.C. 154(b) by 238 days.

(21) Appl. No.: 10/119,978

(22) Filed: Apr. 10, 2002

(65) Prior Publication Data

US 2002/0150802 A1 Oct. 17, 2002

(30) Foreign Application Priority Data

Apr. 11, 2001 (JP) .................................. 2001-113082
Feb. 8, 2002 (JP) .................................. 2002-032345

(51) Int. Cl.[7] .............................................. H01M 8/12
(52) U.S. Cl. ............................ 429/24; 429/12; 429/13; 429/17
(58) Field of Search ............................ 429/12, 13, 17, 429/24

(56) References Cited

U.S. PATENT DOCUMENTS

| 4,795,683 A | 1/1989 | McElroy |
| 6,045,934 A | 4/2000 | Enami |
| 6,500,573 B1 * | 12/2002 | Simazu et al. ............ 429/22 |
| 2001/0012575 A1 * | 8/2001 | Katagiri et al. ........... 429/22 |

* cited by examiner

*Primary Examiner*—Dah-Wei Yuan

(57) ABSTRACT

A fuel cell system includes a heat-generation amount detection device for detecting a heat generation amount in a fuel cell, and an evaporation amount controller for controlling an evaporation amount of water in the fuel cell based on the detected heat generation amount. The heat generation amount is detected based on an output electric power of the fuel cell, an output current thereof or a temperature thereof. The evaporation amount of water in the fuel cell is controlled by adjusting at least one humidification amount of hydrogen and oxygen to be supplied to the fuel cell, or by adjusting at least one flow amount of hydrogen and oxygen to be supplied to the fuel cell.

20 Claims, 11 Drawing Sheets

WATER CONTROL FOR A FUEL CELL SYSTEM

CROSS-REFERENCE TO RELATED APPLICATION

This application is related to and claims priority from Japanese Patent Applications No. 2001-113082 filed on Apr. 11, 2001, and No. 2002-32345 filed on Feb. 8, 2002, the contents of which are hereby incorporated by reference.

BACKGROUND OF THE INVENTION

1. Field of the Invention

The present invention relates to a fuel cell system having a fuel cell that generates electric power by an electrochemical reaction between hydrogen and oxygen. The fuel cell system is suitably used for a movement body such as a vehicle, a ship and a portable generator.

2. Description of Related Art

In a fuel cell for generating electrical power using a chemical reaction between hydrogen and oxygen, heat is generated due to the chemical reaction. Therefore, the fuel cell is need to be maintained at a predetermined temperature (e.g., about 80° C.) for improving power generation efficiency. For example, heat generated due to the chemical reaction is radiated to atmospheric air by using a radiator through cooling water. Although a heat generation amount in the fuel cell is small, a heat radiation amount due to exhaust gas is small. Accordingly, a heat radiation amount in the radiator using cooling water is increased. Further, since a temperature difference between cooling water and atmospheric air is small, a cooling operation using the radiator is not effective. Thus, in order to sufficiently cool the fuel cell only using the radiator, it is need to increase the size of the radiator.

SUMMARY OF THE INVENTION

In view of the foregoing problem, it is an object of the present invention to provide a fuel cell system which increases a cooling capacity for cooling a fuel cell by using an evaporation latent heat of water in the fuel cell in addition to a radiator.

According to the present invention, in a fuel cell system having a fuel cell that generates electrical energy by an electrochemical reaction between hydrogen and oxygen, a heat-generation amount detection device is provided for detecting a heat generation amount in the fuel cell, and an evaporation amount controller controls an evaporation amount of water in the fuel cell based on the heat generation amount detected by the heat-generation amount detection device. Accordingly, the fuel cell can be cooled using the evaporation latent heat of water in the fuel cell by adjusting the evaporation amount of water in the fuel cell. Thus, a cooling load in a radiator for cooling the fuel cell can be reduced, thereby reducing a size of the radiator.

Preferably, the heat-generation amount detection device is an electric-power detection device for detecting an electric power output from the fuel cell. When the electric power detected by the electric-power detection device is larger than a predetermined value, the evaporation amount controller increases the evaporation amount of the water in the fuel cell. Alternatively, the heat-generation amount detection device is a current detection device for detecting a current output from the fuel cell. Further, when the current detected by the current detection device is larger than a predetermined current, the evaporation amount controller increases the evaporation amount of water in the fuel cell. Accordingly, an increase of the heat-generation amount can be indirectly detected, and the evaporation amount of the water in the fuel cell can be suitably controlled.

Alternatively, the heat-generation amount detection device is a temperature detection device for detecting a temperature of the fuel cell. Further, when the temperature detected by the temperature detection device is higher than a predetermined temperature, the evaporation amount controller increases the evaporation amount of water in the fuel cell. Accordingly, the increase of the heat generation amount can be directly detected, and the evaporation amount of the water in the fuel cell can be suitably controlled.

Preferably, the evaporation amount controller is a humidification amount adjuster for adjusting at least one humidification amount of hydrogen and oxygen to be supplied to the fuel cell. In this case, the evaporation amount of water in the fuel cell can be increased, when the humidification amount adjuster reduces the humidification amount. Alternatively, the evaporation amount controller is at least one of a hydrogen pressure adjuster for adjusting a pressure of hydrogen to be supplied to the fuel cell, and an oxygen pressure adjuster for adjusting a pressure of oxygen to be supplied to the fuel cell. In this case, the evaporation amount of water in the fuel cell can be increased by reducing at least one of hydrogen pressure using the hydrogen pressure adjuster, and oxygen pressure using the oxygen pressure adjuster. Alternatively, the evaporation amount controller is one of a hydrogen-flowing amount adjuster for adjusting an amount of hydrogen to be supplied to the fuel cell and an oxygen-flowing amount adjuster for adjusting an amount of oxygen to be supplied to the fuel cell. In this case, the evaporation amount of water in the fuel cell can be increased by increasing at least one of a hydrogen amount using the hydrogen-flowing amount adjuster, and an oxygen amount using the oxygen-flowing amount adjuster.

According to the present invention, the fuel cell system includes water-amount determining means for determining a water amount in the fuel cell, and cooling determining means for determining a need of cooling in the fuel cell based on the heat generation amount detected by the heat-generation amount detection device. Further, when the cooling determining means determines that the fuel cell is need to be cooled, and when the water-amount determining means determines that the water amount in the fuel cell is sufficient, the evaporation amount controller increases the evaporation amount of water in the fuel cell. Accordingly, the cooling capacity of the fuel cell system can be effectively improved, while operation efficiency of the fuel cell system is improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
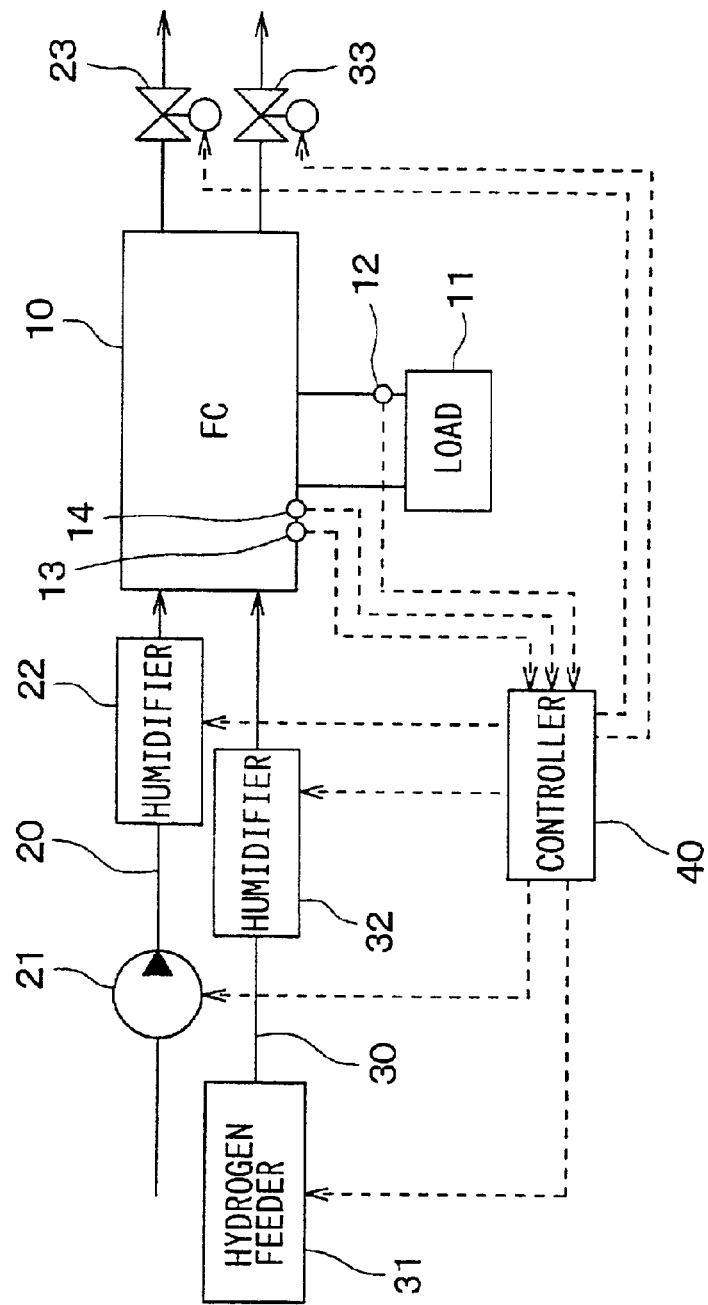
FIG. 1 is a schematic diagram showing a fuel cell system according to embodiments of the present invention.

A first embodiment of the present invention will be now described with reference to FIGS. 1–5. For example, a fuel cell system according to the first embodiment is suitable used for an electric vehicle (fuel-cell vehicle) driven by a fuel cell as a power source. As shown in FIG. 1, the fuel cell system according to the first embodiment includes a fuel cell 10, an air feeder 21, a hydrogen feeder 31, humidifiers 22, 32, a controller 40 and the like.

The fuel cell (FC stack) 10 generates electric power using an electrochemical reaction between hydrogen and oxygen. In the first embodiment, a polymer electrolyte is used for the fuel cell 10, and the fuel cell 10 is constructed by stacking plural cells. An electrolyte film is sandwiched by a pair of electrodes so that each cell is constructed. The fuel cell 10 is disposed so as to supply electric power to an electric load 11 such as a vehicle motor, and a secondary battery. Hydrogen and air (oxygen) are supplied to the fuel cell 10. In the fuel cell 10, the following electrochemical reaction between oxygen and hydrogen occurs, and electrical energy is generated by the electrochemical reaction.

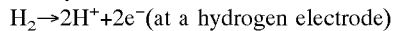
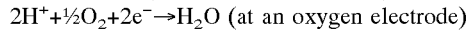

$H_2 \rightarrow 2H^+ + 2e^-$ (at a hydrogen electrode)

$2H^+ + \frac{1}{2}O_2 + 2e^- \rightarrow H_2O$ (at an oxygen electrode)

Humidified hydrogen and humidified air are supplied to the fuel cell 10, while water is generated due to this electrochemical reaction. Therefore, condensed water is readily generated in the fuel cell 10. That is, in the fuel cell 10, there is water in a hydrogen passage through which hydrogen flows, and in an air passage through which air flows.

Figure 2:
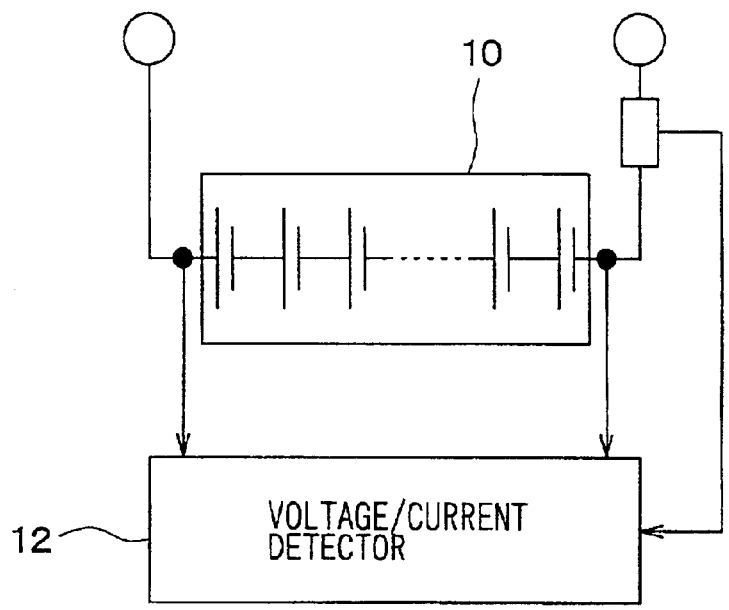
FIG. 2 is a schematic diagram showing a voltage/current detection device of the fuel cell system in FIG. 1.

As shown in FIGS. 1 and 2, the fuel cell 10 includes a voltage/current detection device 12, a temperature detection device 13 and an inner resistance detection device 14. The voltage/current detection device 12 detects an output voltage VF of the fuel cell 10 and an output current IF thereof. Further, the temperature detection device 13 detects a temperature of the fuel cell 10, and the inner resistance detection device 14 detects an inner resistance thereof.

The fuel cell system includes an air passage 20 through which air (oxygen) is supplied to the oxygen electrode (positive electrode) of the fuel cell 10, and a hydrogen passage 30 through which hydrogen is supplied to the hydrogen electrode (negative electrode) thereof. The air feeder 21 for supplying air is provided at an upstream end of the air passage 20, and the hydrogen feeder 31 for supplying hydrogen is provided at an upstream end of the hydrogen passage 30. For example, the air feeder 21 can be constructed by a compressor, and the hydrogen feeder 31 can be constructed by a hydrogen generator or a hydrogen tank. Here, the hydrogen tank has therein a hydrogen storage material such as a hydrogen absorbing alloy for storing pure hydrogen. The air feeder 21 has an air-flowing amount adjuster for adjusting an air supply amount (air flowing amount) in the air passage 20. The hydrogen feeder 31 has a hydrogen-flowing amount adjuster for adjusting a hydrogen supply amount (hydrogen flowing amount) in the hydrogen passage 30.

Since each electrolyte film of the fuel cell 10 needs moisture (water) for performing the above electrochemical reaction, the humidifier 22 for humidifying air to be supplied to the fuel cell 10 is provided in the air passage 20. Similarly, the humidifier 32 for humidifying hydrogen to be supplied to the fuel cell 10 is provided in the hydrogen passage 30. The humidifiers 22, 32 include humidification amount adjusters for adjusting humidification amounts (degrees) in air and hydrogen. Accordingly, the humidifiers 22, 32 can be used as an evaporation amount controller.

Further, an air back-pressure control valve 23 is provided in the air passage 20 at a downstream side of the fuel cell 10, to be used as an oxygen pressure controller for adjusting an air pressure (oxygen pressure) in the air passage 20. A hydrogen back-pressure control valve 33 is provided in the hydrogen passage at a downstream side of the fuel cell 10 to be used as a hydrogen pressure control valve for adjusting a hydrogen pressure in the hydrogen passage 30. The air pressure and the hydrogen pressure can be controlled by controlling open degrees of these back-pressure control valves 23, 33, respectively.

Since the fuel cell 10 generates heat due to the chemical reaction, during power generation. The fuel cell 10 is need to be maintained at a predetermined temperature (e.g., about 80° C.) during the power generation, for improving power generation efficiency. Therefore, in the fuel cell system, a cooling system (not shown) having a radiator is provided for radiating heat generated by the fuel cell 10 to an outside of the fuel cell system. Further, the controller 40 is disposed for controlling various components in the fuel cell system. Signals are inputted to the controller 40 from the voltage/current detection device 12, the temperature detection device 13 and the inner-resistance detection device 14 and the like. The controller 40 outputs control signals to the air feeder 21, the hydrogen feeder 31, the humidifiers 22, 32, and the back-pressure control valves 23, 33.

Figure 4:
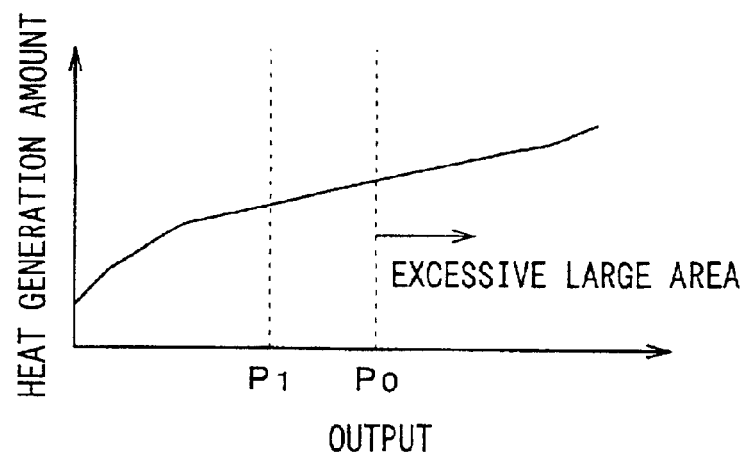
FIG. 4 is a characteristic graph showing a relationship between output electric power of a fuel cell and a heat generation amount thereof according to the first embodiment.
Figure 3:
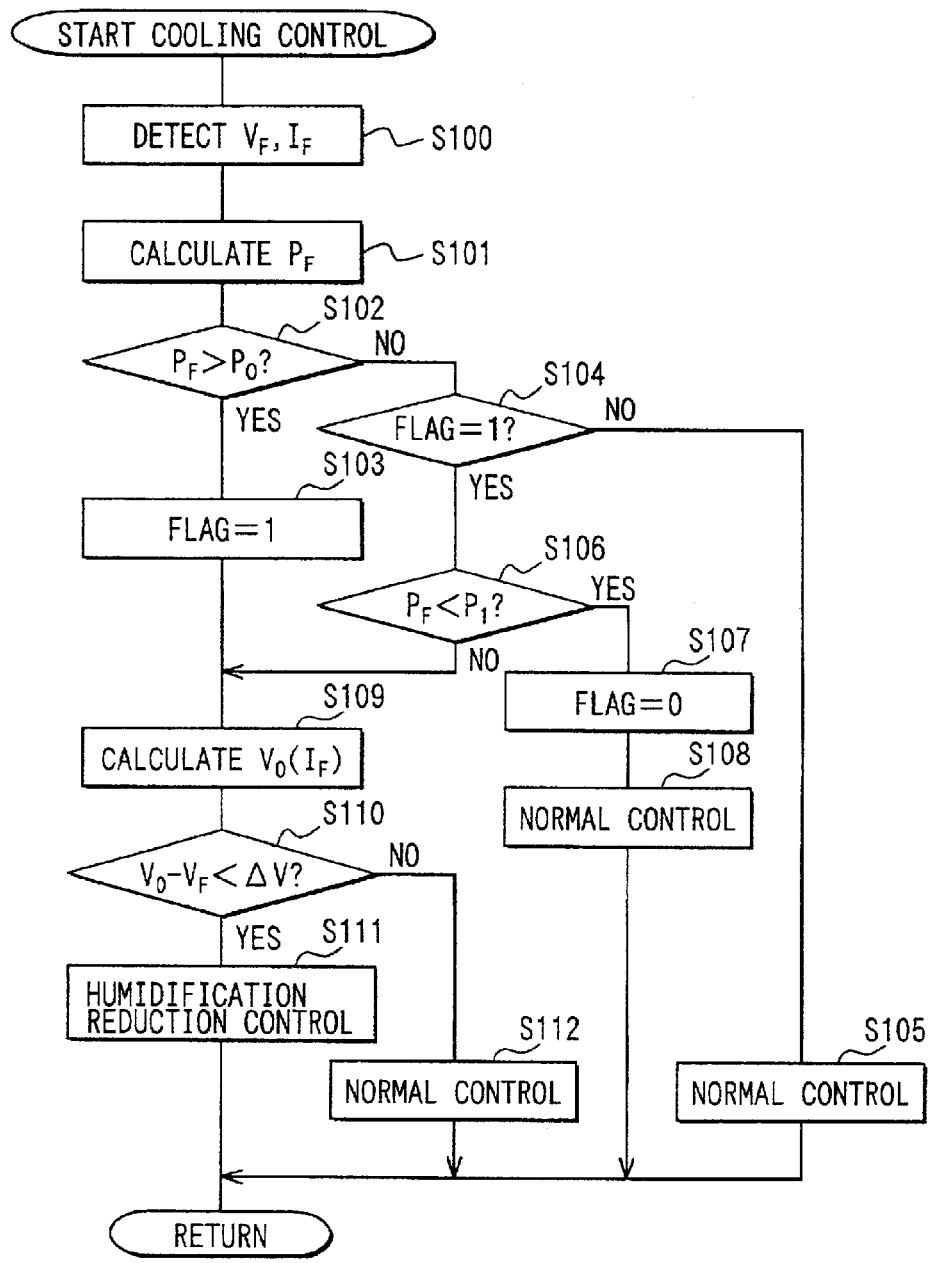
FIG. 3 is a flow diagram showing cooling control operation of a fuel cell system according to a first embodiment of the present invention.

Next, cooling control of the fuel cell system according to the first embodiment will be now described with reference to FIGS. 3, 4. In FIG. 3, after the cooling control is started, it is determined whether or not the fuel cell 10 is need to be cooled by evaporation cooling, that is, it is determined whether or not an heat generation amount in the fuel cell 10 is larger than a predetermined amount. As shown in FIG. 4, as output power of the fuel cell 10 increases, the heat generation amount thereof increases. Therefore, the heat generation amount in the fuel cell 10 can be indirectly detected by detecting output power of the fuel cell 10.

Specifically, as shown in FIG. 3, the voltage VF of the fuel cell 10 and the current IF thereof are detected by the voltage/current detection device 12 at step S100. At step S101, output power PF of the fuel cell 10 is calculated using a formula (PF=VF×IF). At step S102, it is determined whether the output power PF is larger than a first predetermined output power P0 for starting the cooling control. When the output power PF is larger than the first predetermined output power P0, it is determined that the heat generation amount in the fuel cell 10 is excessively large, and the control program proceeds to step S103. In this case at step S103, a cooling control flag (flag) is set at 1 (flag=1), and a cooling control mode for performing cooling control of the fuel cell 10 is set. When the output power PF is smaller than the first predetermined output power P0, it is determined whether or not the flag is set at 1, that is, it is determined whether or not the cooling control mode is set.

When the flag is zero (flag=0), that is, when the cooling control mode is not set, a normal control mode is set at step S105. In the normal control mode, the humidifiers 22, 32 are controlled to be operated by a normal humidification amount. On the other hand, when the flag is 1, that is, when the cooling control mode is set, it is determined whether or not the output power PF is smaller than a second predetermined output power P1 at step S106. When the output power PF is larger than the second predetermined output power P1, it can be also determined that the cooling control is need to be performed. When the output power PF is smaller than the second predetermined output power P1 smaller than the first predetermined output P0, it can be determined that cooling control for cooling the fuel cell 10 is unnecessary. Therefore, the flag is set at zero, and the normal control mode is performed at step S107. At step S108, the humidifiers 22, 32 are controlled to be operated by the normal humidification amounts.

Before the cooling control operation of the fuel cell 10 is performed, it is estimated whether or not a water amount in the fuel cell 10 is sufficient at steps S109, S110. At step S109, a reference voltage VO, corresponding to a current IF detected by the voltage/current detection device 12, is calculated based on an I-V characteristic map shown in FIG. 5. The I-V characteristic map indicates a relationship between the reference voltage VO and a current IO from the fuel cell 10. At step S110, it is determined whether or not a voltage difference (VO−VF) between the reference voltage VO and the voltage VF detected by the voltage/current detection device 12 is smaller than a predetermined voltage ΔV.

When the voltage difference (VO−VF) is smaller than the predetermined voltage ΔV, it can be estimated that the water amount in the fuel cell 10 is sufficient and the inner resistance of the fuel cell 10 is sufficiently small. Therefore, water in the fuel cell 10 is evaporated. In the first embodiment, each humidification amount in the humidifiers 22, 32 is reduced than that in the normal control mode at step S111. Therefore, low-humidity hydrogen and low-humidity air are supplied to the fuel cell 10, and an evaporation amount of water in the fuel cell is increased. As a result, the fuel cell 10 is cooled due to latent heat of the water evaporation.

On the other hand, when the voltage difference (VO−VF) is larger than the predetermined voltage ΔV, it can be estimated that the inner resistance of the fuel cell 10 is increased due to water deficiency in the fuel cell 10 and an output voltage thereof is reduced. In this case, the humidification amount of the humidifiers 22, 32 is not reduced, that is, the fuel cell 10 is not cooled in order to preferentially obtain a necessary output voltage of the fuel cell 10. Accordingly, at step S112, the humidifiers 22, 32 are controlled by the normal humidification amounts. At this time, the humidification amount may be increased to increase the water amount in the fuel cell 10.

According to the first embodiment of the present invention, the fuel cell 10 can be further cooled using the evaporation latent heat of water in the fuel cell 10. In the first embodiment, a cooling capacity of the fuel cell system can be increased without adding a new component. Therefore, a heat radiation amount in the general radiator can be reduced, thereby reducing the size of the radiator.

Figure 6:
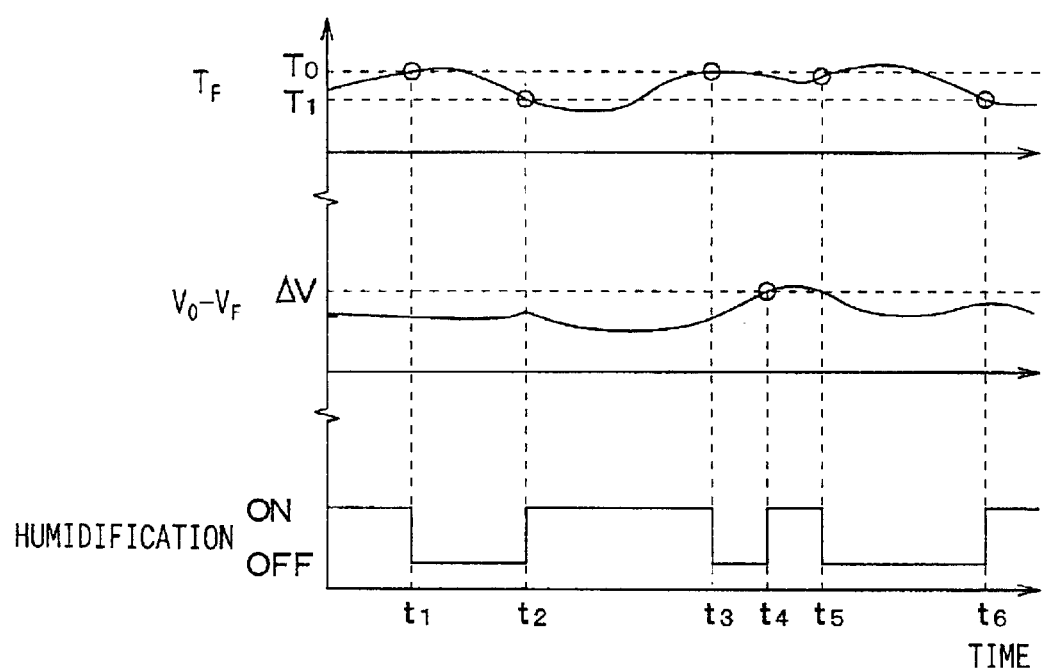
FIG. 6 is a timing diagram showing cooling control operation of a fuel cell system according to a second embodiment of the present invention.
Figure 7:
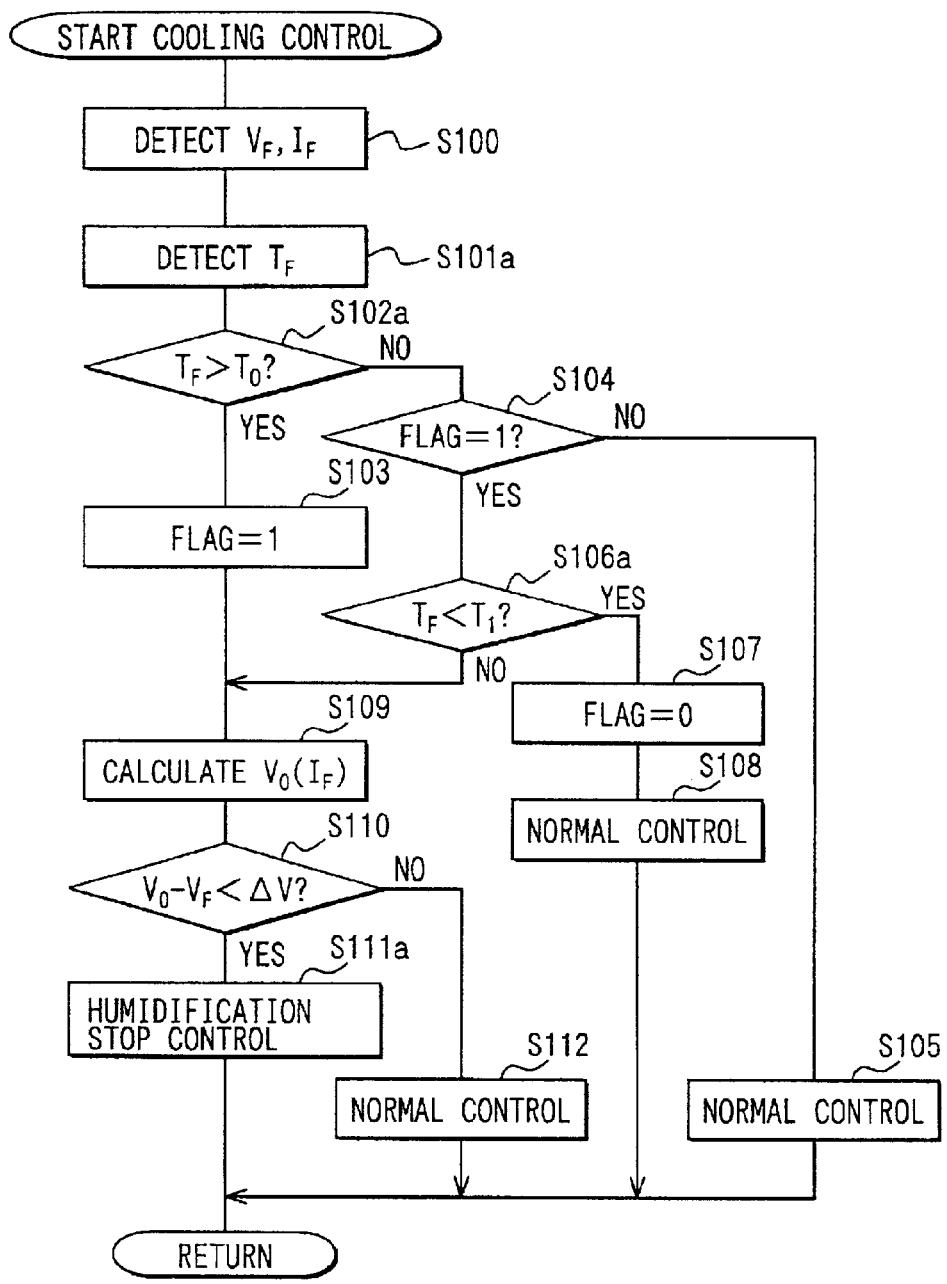
FIG. 7 is a flow diagram showing cooling control processes of the fuel cell system according to the second embodiment.

A second embodiment of the present invention will be described with reference to FIGS. 6 and 7. In the second embodiment, a fuel cell system has a structure similar to that in FIG. 1. In the second embodiment, the cooling control operation is different from that in the first embodiment. Here, an explanation of control parts similar to those in the first embodiment are omitted. In the second embodiment, as shown in FIG. 6, when a temperature TF of the fuel cell 10 increases higher than a first predetermined temperature To, and when the voltage difference (VO−VF) is smaller than the predetermined voltage ΔV, humidification of the humidifiers 22, 32 is stopped. For example, the humidification amount of each humidifier 22, 32 is made to be zero at times t1, t3, t5. When the temperature TF of the fuel cell 10 is lower than a second predetermined temperature T1 while the humidification is stopped, the humidification is started to be normally controlled at times t2, t6. Also when the voltage difference (VO−VF) is larger than the predetermined voltage ΔV while the humidification is stopped, the humidification is started at a time t4.

Next, the cooling control processes of the fuel cell system according to the second embodiment will be now described with reference to FIG. 7. In FIG. 7, steps similar to those of the above-described first embodiment in FIG. 3 are indicated as the same reference steps, and the detail explanation thereof is omitted. First, it is determined whether or not the fuel cell 10 is need to be cooled, that is, whether or not the heat generation amount is larger than a predetermined amount, similarly to the first embodiment. At step S101a, the heat generation amount in the fuel cell 10 is directly detected by detecting the temperature TF of the fuel cell 10 using the temperature detection device 13. At step S102a, it is determined whether or not the temperature TF is higher than a first predetermined temperature T0. When the temperature TF is lower than a first predetermined temperature T0, and when the flag is set at 1, it is determined whether or not the temperature TF is lower than a second predetermined temperature T1 lower than the first predetermined temperature T0 at step S106a.

In the second embodiment, when the fuel cell is need to be more cooled and the water amount of the fuel cell 10 is sufficient, the humidification operation of the humidifiers 22, 32 is stopped, so that the humidification operation for hydrogen and oxygen is made to be zero at step S111a. Therefore, hydrogen and oxygen, being not humidified, are supplied to the fuel cell 10, thereby increasing the evaporation amount of water in the fuel cell 10, and increasing an cooling amount using the evaporation latent heat. Accordingly, in the second embodiment, advantage similar to that in the above-described first embodiment can be obtained.

Figure 8:
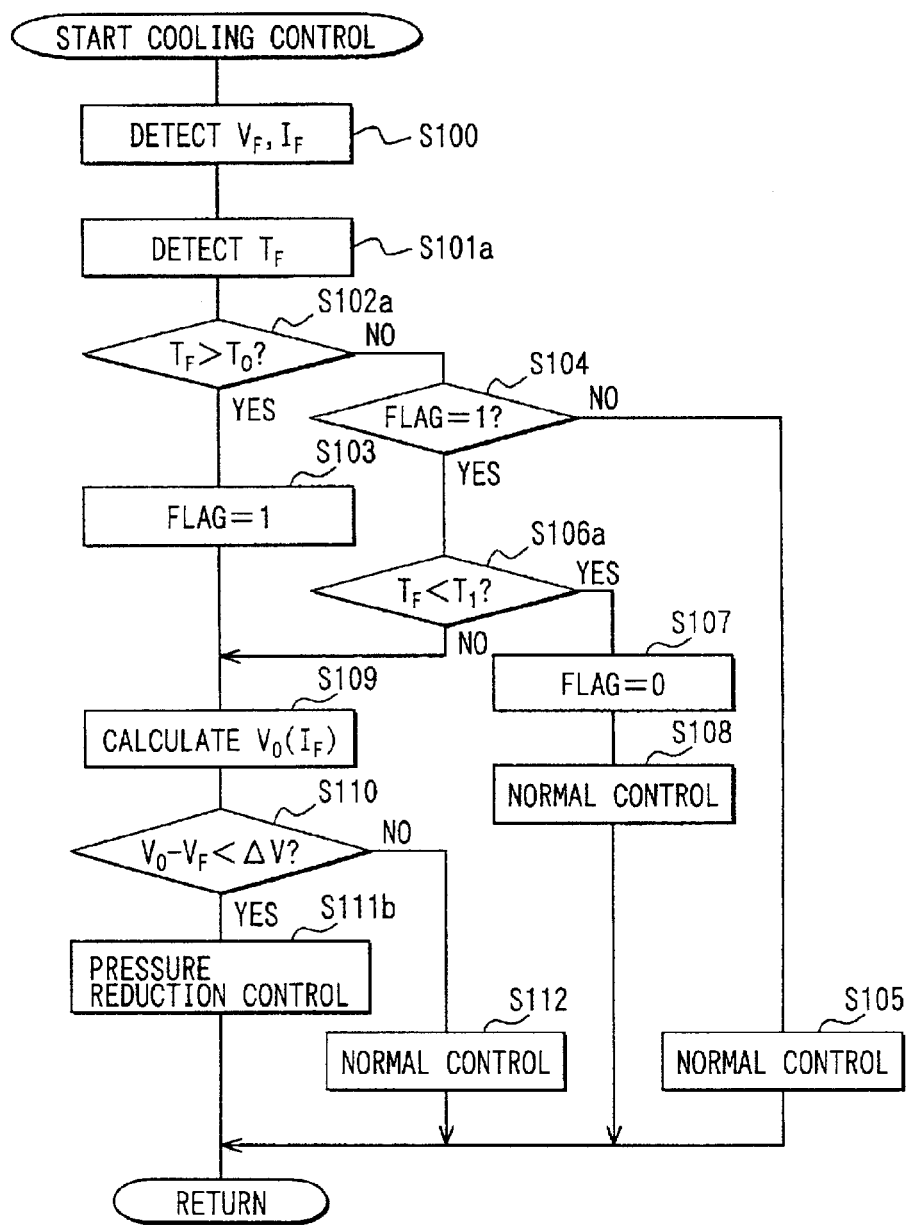
FIG. 8 is a flow diagram showing cooling control processes of a fuel cell system according to a third embodiment of the present invention.

A third embodiment of the present invention will be described with reference to FIG. 8. In the third embodiment, a fuel cell system has a structure similar to that in FIG. 1. In the third embodiment, the cooling control operation is different from that in the above-described first and second embodiments. Here, an explanation of control parts similar to those in the above-described first and second embodiments are omitted.

In the third embodiment, the evaporation amount controller for controlling an evaporation amount of water in the fuel cell 10 is constructed by the back-pressure control valves 23, 33. As shown in FIG. 8, at step S111b, pressure reduction control is performed by the back-pressure control valves 23, 33. Specifically, open degrees of the back-pressure control valves 23, 33 are increased, thereby reducing a hydrogen pressure and an oxygen pressure in the fuel cell 10, and increasing the evaporation amount of water in the fuel cell 10. In the third embodiment, when the fuel cell is need to be cooled and the water amount of the fuel cell 10 is sufficient, the pressure-reduction control is performed by the back-pressure control valves 23, 33, at step S111b, so that the evaporation amount of water in the fuel cell 10 is increased, and the cooling amount of the fuel cell 10 is increased. In the third embodiment, the other steps except for step S111b are similar to those of the above-described second embodiment. Accordingly, in the third embodiment, advantage similar to that in the above-described first embodiment can be obtained.

Figure 9:
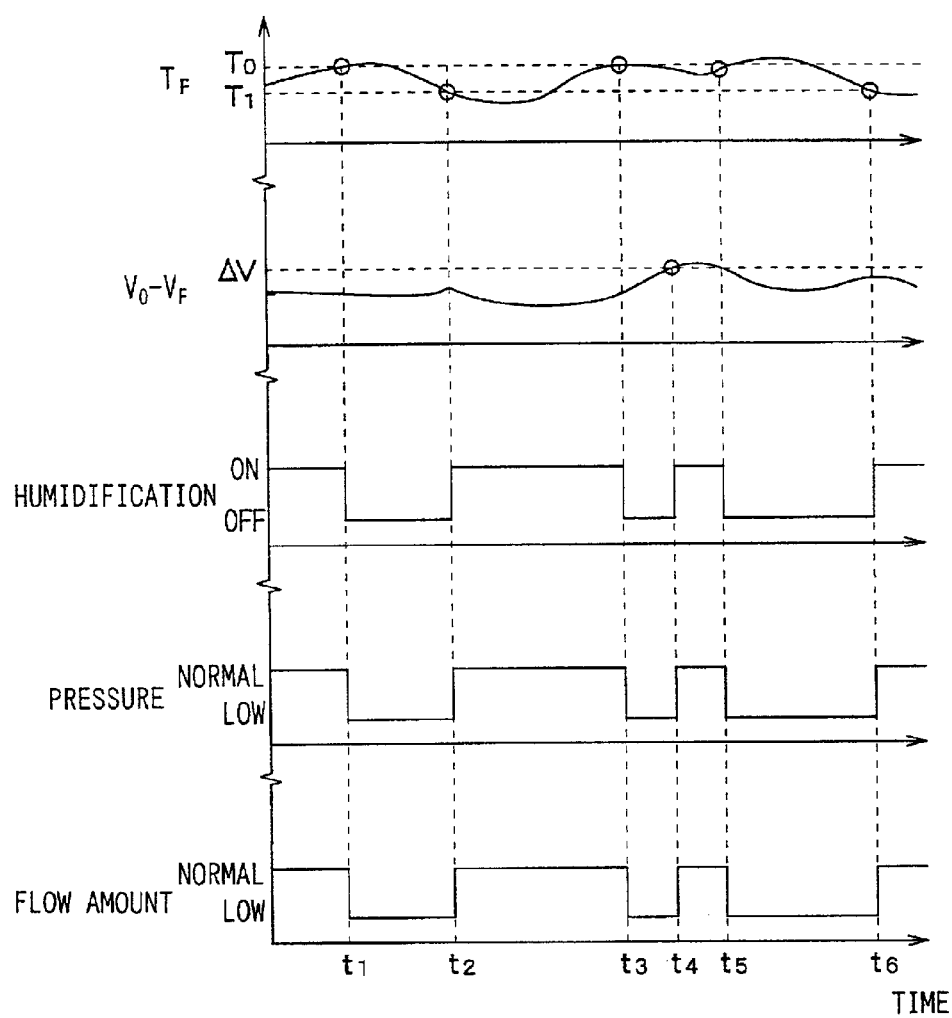
FIG. 9 is a timing diagram showing cooling control operation of a fuel cell system according to a fourth embodiment of the present invention.
Figure 10:
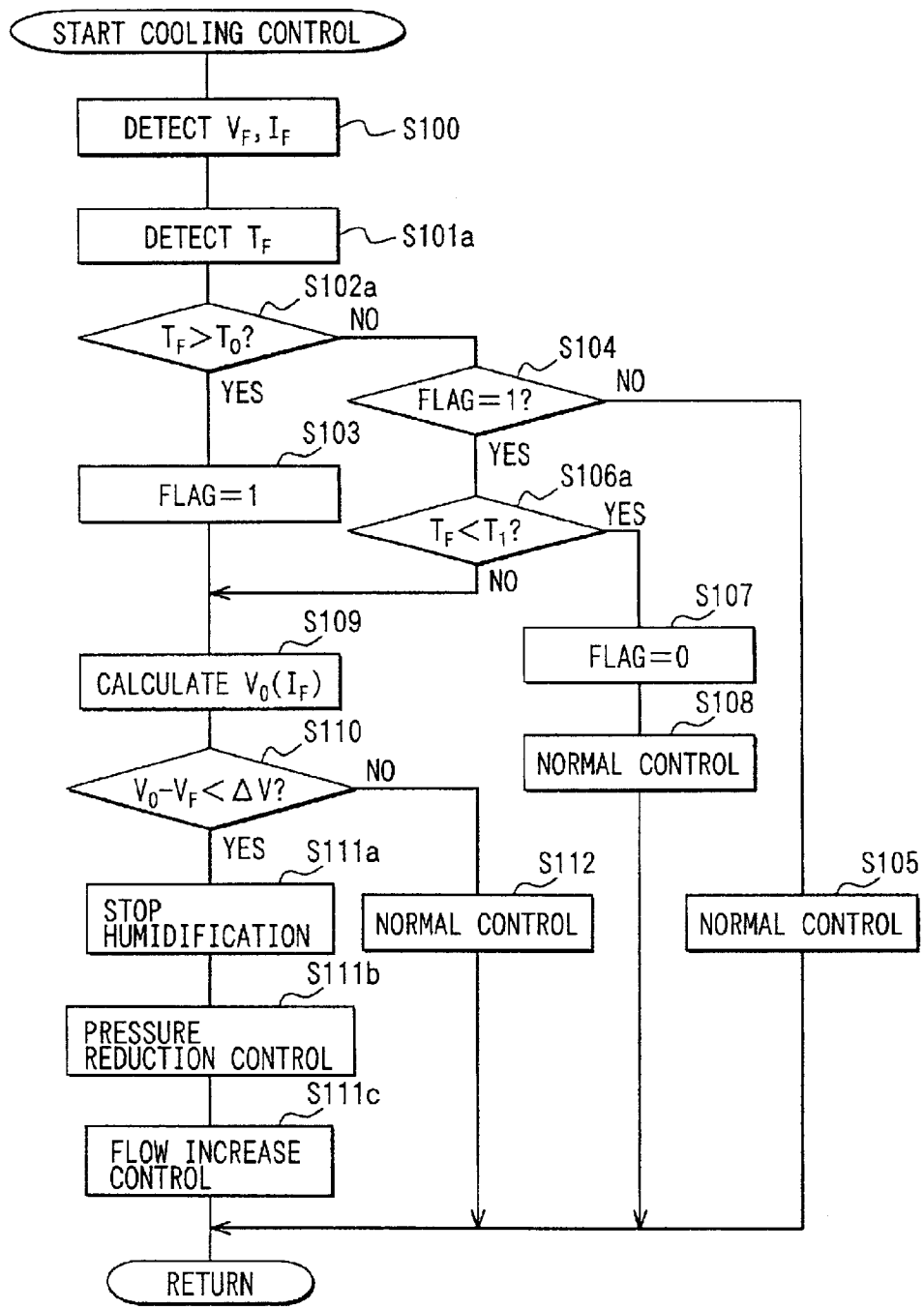
FIG. 10 is a flow diagram showing cooling control processes of the fuel cell system according to the fourth embodiment.

A fourth embodiment of the present invention will be described with reference to FIGS. 9 and 10. In the fourth embodiment, the evaporation amount controller is constructed by a combination of plural devices. Specifically, the evaporation amount controller is constructed by combining the air feeder 21, the hydrogen feeder 31, the humidifiers 22, 32 and the back-pressure control valves 23, 33. In the fourth embodiment, a fuel cell system has a structure similar to that in FIG. 1, while the cooling control operation is different from that in the above-described first through third embodiments. Here, an explanation of control parts similar to those in the above-described first through third embodiments are omitted.

In the fourth embodiment, the water evaporation amount can be controlled also by the air feeder 21 and the hydrogen feeder 31. Specifically, the water evaporation amount can be increased by increasing an supply amount of hydrogen and oxygen using the air feeder 21 and the hydrogen feeder 31. On the contrary, the water evaporation amount can be decreased by reducing an supply amount of hydrogen and oxygen using the air feeder 21 and the hydrogen feeder 31. As shown in FIGS. 9, 10, at steps S111a, S111b and S111c, the evaporation amount of water in the fuel cell 10 can be controlled by the pressure reduction control using the back-pressure control valves 23, 33 and the flow increase control using the air feeder 21 and the hydrogen feeder 31 in addition to the humidification stop of the humidifiers 22,32. In the flow increase control, the hydrogen flow amount and the oxygen flow amount to be supplied into the fuel cell 10 are increased by the air feeder 21 and the hydrogen feeder 31.

In the fourth embodiment, when the fuel cell is need to be cooled and the water amount of the fuel cell 10 is sufficient, the humidification operation of the humidifiers 22, 32 is stopped at step S111a, the pressure-reduction control is performed at step S111b, and the flow increase control is performed at step S111c, so that the water evaporation amount in the fuel cell 10 can be increased. In the force embodiment, when the fuel cell is need to be cooled and the water amount of the fuel cell 10 is sufficient, only the flow increase control at step S111c can be performed, without performing operation steps S111a, S111b.

Accordingly, in the fourth embodiment, advantage similar to that in the above-described first embodiment can be obtained.

A fifth embodiment of the present invention will be described with reference to FIGS. 11 and 12. In the fifth embodiment, before water in the fuel cell 10 is evaporated, a water amount in the fuel cell 10 is increased by increasing a humidification amount of air and hydrogen to be supplied to the fuel cell 10. In the fifth embodiment, the other parts are similar to those of the above-described second embodiment.

Figure 11:
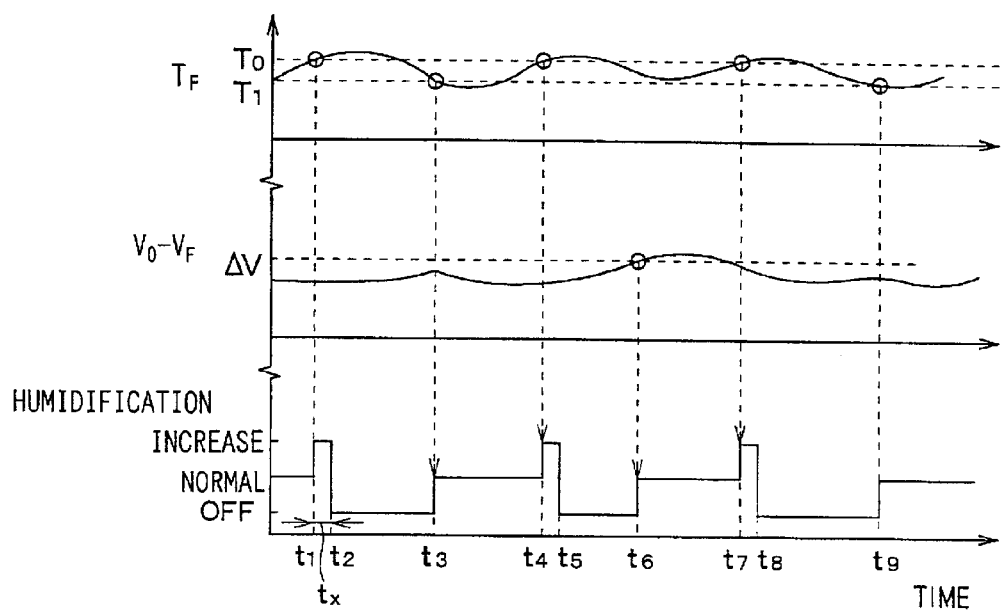
FIG. 11 is a timing diagram showing cooling control of a fuel cell system according to a fifth embodiment of the present invention.
Figure 12:
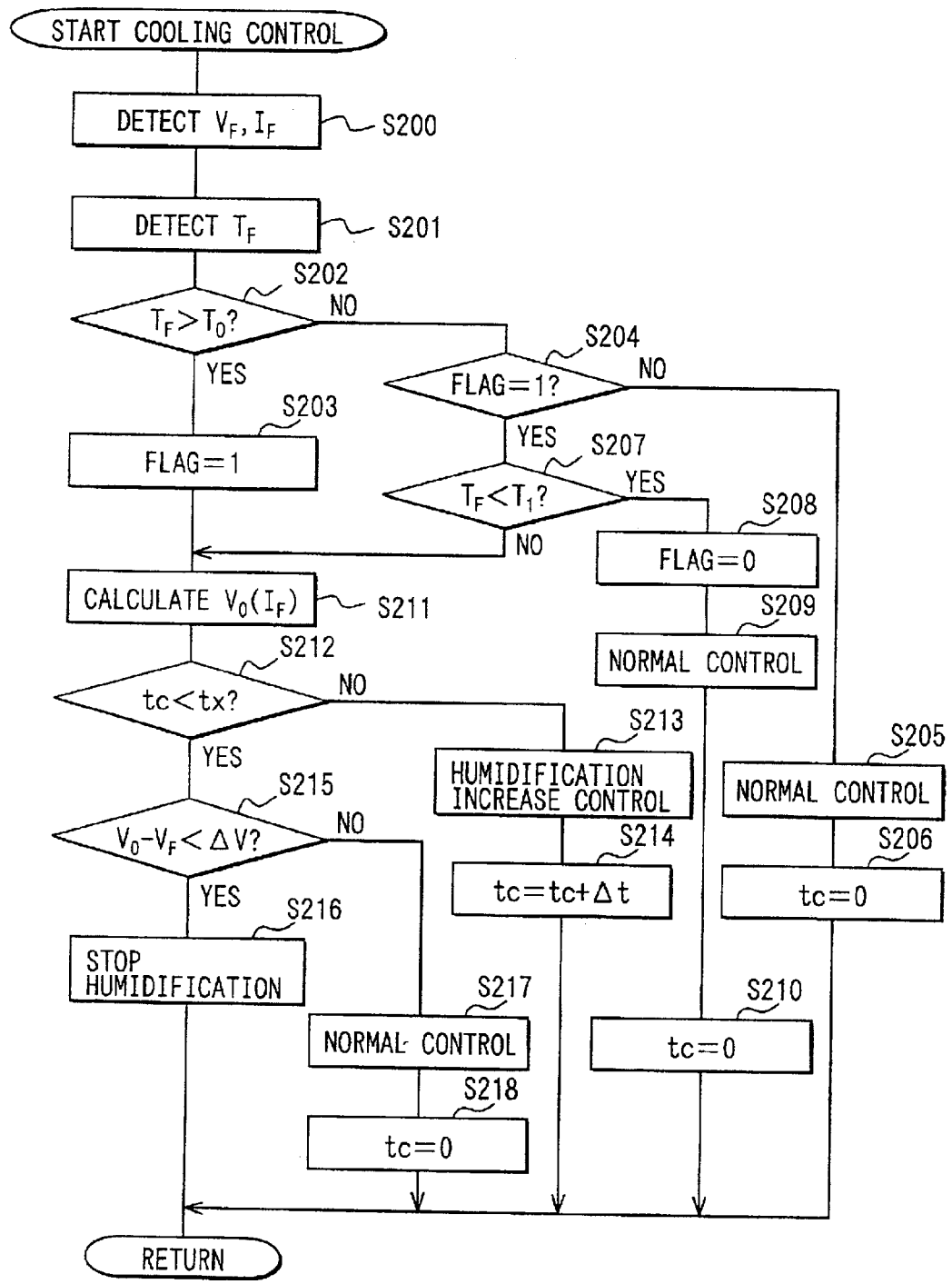
FIG. 12 is a flow diagram showing cooling control processes of the fuel cell system according to the fifth embodiment.

As shown in FIG. 11, when the temperature TF of the fuel cell 10 increases higher than the first predetermined temperature T0, and when the voltage difference (VO−VF) is smaller than the predetermined voltage ΔV, the humidification amount using the humidifiers 22, 32 is increased for a predetermined time tx at times t1, t4, t7. Thereafter, the humidification operation of the humidifiers 22, 32 is stopped, and the humidification amount is made to be zero at times t2, t5, t8. When the temperature TF of the fuel cell 10 is lower than the second predetermined temperature T1 lower than the first predetermined temperature T0 while the humidification operation is stopped, the humidification operation is started and are normally controlled at times t3, t9. Alternatively, when the voltage difference (VO−VF) is larger than the predetermined voltage ΔV while the humidification operation is stopped, the humidification operation is started at time t6.

Next, the cooling control of a fuel cell system according to the fifth embodiment will be now described with reference to FIG. 12. First, it is determined whether or not the fuel cell 10 is need to be cooled, that is, whether or not the heat generation amount in the fuel cell 10 is larger than a predetermined amount. At step S200, the voltage VF of the fuel cell 10 and the current IF thereof are detected by the voltage/current detection device 12. At step S201, the temperature TF of the fuel cell 10 is detected by the temperature detection device 13. At step S202, it is determined whether or not the temperature TF detected by the voltage/current detection device 12 is higher than the first temperature T0.

When the temperature TF of the fuel cell 10 is higher than the first predetermined temperature T0, it can be determined that the heat generation amount is excessively large, and the control program proceeds to step S203. At step S203, the flag is set at 1, and the cooling control mode, where the cooling control of the fuel cell 10 is performed to be cooled, is set. When the temperature TF is lower than the first predetermined temperature T), it is determined whether or not the flag is 1, that is, it is determined whether or not the cooling control mode is set at step S204. When the flag is down (zero), that is, when the cooling control mode is not set, the normal control is performed at step S205. At step S206, a control time tc, for which a humidification amount is increased, is initialized. When the flag is up (1), that is, when the cooling control mode is set, it is determined whether or not the temperature TF of the fuel cell 10 is lower than the second predetermined temperature T1 lower than the first predetermined temperature T0 at step S207.

When the temperature TF is higher than the second predetermined temperature T1 at step S207, it can be determined that the cooling control is need still, and the cooling control is performed. When the temperature TF is lower than the second predetermined temperature T1, it can be determined that cooling control is unnecessary, and the flag is set at zero at step S208. At step S209, the normal control mode is set so that the humidifiers 22, 32 are controlled at the normal humidification amount. Also in this case, the control time tc, for which a humidification amount is increased, is initialized (tc=0).

Figure 5:
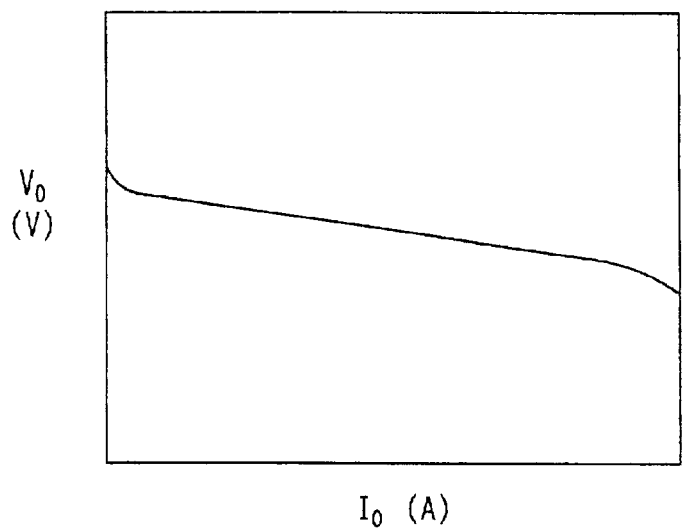
FIG. 5 is a characteristic graph showing a relationship between an output current I0 of the fuel cell and an output voltage V0 thereof.

At step S211, a reference voltage Vo, corresponding to the current IF detected by the voltage/current detection device 12, is calculated based on an I-V characteristic map shown in FIG. 5. At steps S212–S214, the humidification amount in each of the humidifiers 22, 32 is increased for a predetermined time before performing the evaporation control of water in the fuel cell 10. The increase control of the humidification amount is performed until the control time tc passes the predetermined time tx. At step S215, it is determined whether-or not the voltage difference (VO–VF) is smaller than the predetermined voltage ΔV.

When the voltage difference (VO–VF) is smaller than the predetermined voltage ΔV, it can be determined that the water amount is sufficient in the fuel cell 10 and the inner resistance of the fuel cell is sufficiently low. In this case, the humidification operation of each of the humidifiers 22, 32 is stopped. Thereafter, water in the fuel cell 10 is evaporated. In the fifth embodiment, because the humidification of the humidifiers 22, 32 is stopped at step S216, the evaporation amount of water in the fuel cell 10 is increased, and the fuel cell 10 is cooled due to the evaporation latent heat of water in the fuel cell 10.

On the other hand, when the voltage difference (VO–VF) is larger than the predetermined voltage ΔV, it can be determined that the inner resistance of the fuel cell 10 is increased due to water deficiency therein and the output voltage thereof is reduced. In this case, in order to preferentially ensure the necessary output voltage of the fuel cell 10, the reduction control (e.g., stop control) of humidification amount reduction in hydrogen and air is not performed, and the fuel cell 10 is not cooled. That is, the humidifiers 22, 32 are controlled at the normal humidification amount at step S217. Also in this case, the control time tc, for which the humidification amount is increased, is initialized (tc=0) at step S218. Thus, the amount of water in the fuel cell 10 is increased before evaporating water therein, so that the evaporation latent heat can be sufficiently increased when water in the fuel cell 10 is evaporated. Accordingly, cooling performance of the fuel cell system can be further improved.

When the control time tc is larger than the predetermined time tx at step S212, the humidification increase control is performed at step S213, and the humidification time tx (control time), for which the humidification amounts of the humidifiers 22, 23 are increased, is enlarged.

According to the fifth embodiment of the present invention, before the water in the fuel cell 10 is evaporated, the water amount in the fuel cell 10 is increased beforehand. Therefore, evaporation latent heat can be greatly increased while the water in the fuel cell 10 is evaporated, thereby further improving cooling performance of the fuel cell system.

Figure 13:
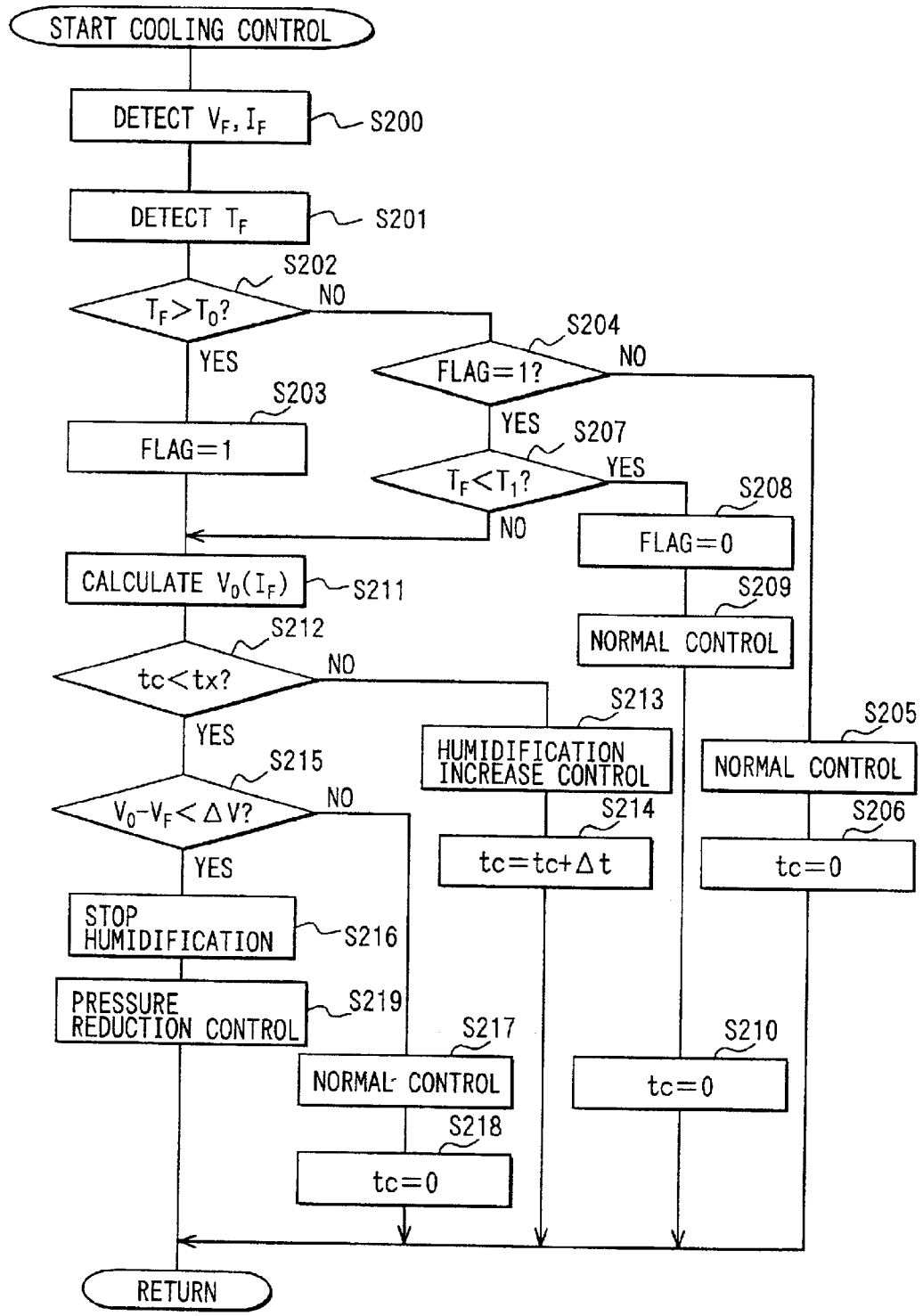
FIG. 13 is a flow diagram showing cooling control processes of a fuel cell system according to a sixth embodiment of the present invention.

A sixth embodiment of the present invention will be described with reference to FIG. 13. In the sixth embodiment, pressure control is further performed in addition to the humidification control described in the above-fifth embodiment. In FIG. 13, step S219 is added in the control program in FIG. 12. In FIG. 13, the other steps are similar to those in FIG. 12, and the detail explanation thereof is omitted. As shown in FIG. 13, in the sixth embodiment, after the humidification amounts of the humidifiers 22, 32 are increased for the predetermined time tx, the pressure reduction control is performed using the back-pressure control valves 23, 33, in addition to the humidification stop of the humidifiers 22, 32, at steps S216, S219. Accordingly, the advantage of the above-described fifth embodiment can be omitted.

Although the present invention has been fully described in connection with the preferred embodiments thereof with reference to the accompanying drawings, it is to be noted that various changes and modifications will become apparent to those skilled in the art.

For example, in the above-described embodiments of the present invention, the heat generation amount is directly or indirectly detected using the output PF of the fuel cell 10 or the temperature TF output from the fuel cell 10. However, as the output current of the fuel cell 10 increases, the heat generation amount in the fuel cell 10 is increased. Therefore, the heat generation amount in the fuel cell 10 can be indirectly detected based on the output current IF detected by the voltage/current detection device 12.

Figure 14:
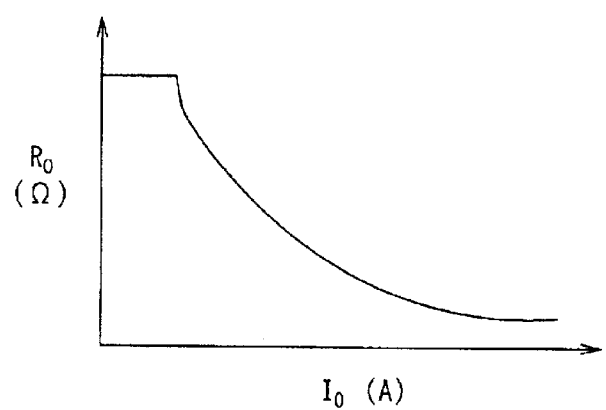
FIG. 14 is a characteristic graph showing a relationship between an output current (I0) of the fuel cell and an inner resistance (R0) thereof, according to a modification of the present invention.

In the above-described embodiments of the present invention, the amount of water in the fuel cell 10 is determined by the output voltage of the fuel cell 10. However, the water amount in the fuel cell 10 may be estimated based on the inner resistance of the fuel cell 10, without being limited to the output voltage fuel cell 10. Here, when the water amount in the fuel cell 10 is deficient, the inner resistance RF of the fuel cell 10 is increased. A reference inner resistance RO, corresponding to a current IF detected by the voltage/current detection device 12, is calculated based on an I-R characteristic map shown in FIG. 14. The I-R characteristic map of FIG. 14 indicates a relationship between the reference inner resistance RO of the fuel cell 10 and a reference output current IO of the fuel cell 10. When the reference inner resistance RO is larger than the detected inner resistance RF by a predetermined value, the water amount in the fuel cell 10 can be determined to be deficient.

Further, the evaporation amount of water in the fuel cell 10 may be adjusted by adjusting the humidification amount in one of hydrogen and air (oxygen) without limited to both of them in the first embodiment. Generally, a supply flow amount of air is larger than a supply flow amount of hydrogen.

Therefore, when the humidification amount of supply air is controlled, a cooling effect for the fuel cell 10 can be made larger, as compared with a case where the humidification amount of supply hydrogen is controlled.

The evaporation amount of water in the fuel cell 10 may be controlled by adjusting a supply flow amount of any one of air and hydrogen without being limited to both control of supply amounts of air and hydrogen in the above embodiments. A supply amount of air is larger than a supply amount of hydrogen. Therefore, when the supply flow amount of air is controlled, the cooling effect for the fuel cell 10 can be made larger as compared with a case where the supply flow amount of hydrogen is controlled.

Further, the evaporation amount of water in the fuel cell 10 may be controlled by adjusting one of the oxygen pressure and the hydrogen pressure, without being limited to both oxygen and hydrogen pressures as in the third embodiment. Further, the evaporation amount controller may be constructed by an arbitrary combination of the air feeder 21, the hydrogen feeder 31, the humidifiers 22, 32 and the back-pressure control valves 23, 33.

In the above-described embodiments of the present invention, the oxygen includes oxygen contained in air.

Such changes and modifications are to be understood as being within the scope of the present invention as defined by the appended claims.

What is claimed is:

1. A fuel cell system comprising:

a fuel cell for generating electrical energy by an electrochemical reaction between hydrogen and oxygen;

a water-amount detecting device for detecting a water amount in the fuel cell, the water-amount detection device being constructed with a current detection device for detecting a current output from the fuel cell and a voltage detection device for detecting a voltage output from the fuel cell; and an evaporation amount controller for controlling an evaporation amount of water in the fuel cell, wherein, a difference between a reference voltage corresponding to the current detected by the current detection device, and the voltage detected by the voltage detection device, is lamer than a first predetermined value, the evaporation amount controller stops a control of the evaporation amount of water in the fuel cell.

2. The fuel cell system according to claim 1, further comprising:

a temperature detection device for detecting a temperature of the fuel cell, wherein when the temperature detected by the temperature detection device is higher than a predetermined temperature, and when the difference between the reference voltage and the voltage detected by the voltage detection device is larger than a second predetermined value, the evaporation controller stops the control of the evaporation amount of water in the fuel cell.

3. The fuel cell system according to claim 1, wherein the evaporation amount controller is a humidification amount adjuster for adjusting at least one humidification amount of hydrogen and oxygen to be supplied to the fuel cell.

4. The fuel cell system according to claim 3, wherein the evaporation amount of water in the fuel cell is increased, when the humidification amount adjuster reduces the humidification amount than that in a normal operation.

5. The fuel cell system according to claim 1, wherein the evaporation amount controller is at least one of a hydrogen pressure adjuster for adjusting a pressure of hydrogen to be supplied to the fuel cell, and an oxygen pressure adjuster for adjusting a pressure of oxygen to be supplied to the fuel cell.

6. The fuel cell system according to claim 5, wherein the evaporation amount of water in the fuel cell is increased by reducing at least one of hydrogen pressure using the hydrogen pressure adjuster, and oxygen pressure using the oxygen pressure adjuster.

7. The fuel cell system according to claim 1, wherein the evaporation amount controller is at least one of a hydrogen-flowing amount adjuster for adjusting an amount of hydrogen to be supplied to the fuel cell and an oxygen-flowing amount adjuster for adjusting an amount of oxygen to be supplied to the fuel cell.

8. The fuel cell system according to claim 7, wherein the evaporation amount of water in the fuel cell is increased by increasing at least one of hydrogen amount using the hydrogen-flowing amount adjuster, and an oxygen amount using the oxygen-flowing amount adjuster.

9. The fuel cell system according to claim 1, further comprising a water amount controller for controlling a water amount in the fuel cell, wherein the water amount controller increases the water amount in the fuel cell before the evaporation amount of water in the fuel cell is controlled by the evaporation amount controller.

10. The fuel cell system according to claim 1, further comprising determining means for determining whether the evaporation amount is controlled by the evaporation amount controller, based on the water amount detected by the water-amount detection device.

11. The fuel cell system according to claim 1, wherein the water-amount detection device detects the water amount based on the output voltage of the fuel cell.

12. The fuel cell system according to claim 10, wherein the water amount detection device detects the water amount in the fuel cell based on an inner resistance of the fuel cell.

13. A fuel cell system comprising:

a fuel cell for generating electrical energy by an electrochemical reaction between hydrogen and oxygen;

a water-amount detection device for detecting a water amount in the fuel cell;

an evaporator amount controller for controlling an evaporation amount of water in the fuel cell; and determining means for determining whether the evaporation amount is controlled by the evaporation amount controller, based on the water amount detected by the water-amount detection device, wherein:

the water-amount detection device is constructed by a current detection device for detecting a current output from the fuel cell, and an inner resistance detection device for detecting an inner resistance of the fuel cell; and when a difference between a reference inner resistance, corresponding to the output current detected by the current detection device, and the inner resistance detected by the inner resistance detection device is larger than a predetermined value, the evaporation amount controller stops a control of the evaporation amount of water in the fuel cell.

14. The fuel cell system according to claim 13, wherein the evaporation amount controller is a humidification amount adjuster for adjusting at least one humidification amount of hydrogen and oxygen to be supplied to the fuel cell.

15. The fuel cell system according to claim 14, wherein the evaporation amount of water in the fuel cell is increased, when the humidification amount adjuster reduces the humidification amount than that in a normal operation.

16. The fuel cell system according to claim 13, wherein the evaporation amount controller is at least one of a hydrogen pressure adjuster for adjusting a pressure of hydrogen to be supplied to the fuel cell, and an oxygen pressure adjuster for adjusting a pressure of oxygen to be supplied to the fuel cell.

17. The fuel cell system according to claim 16,
wherein the evaporation amount of water in the fuel cell is increased by reducing at least one of hydrogen pressure using the hydrogen pressure adjuster, and oxygen pressure using the oxygen pressure adjuster.

18. The fuel cell system according to claim 13,
wherein the evaporation amount controller is at least one of a hydrogen-flowing amount adjuster for adjusting an amount of hydrogen to be supplied to the fuel cell and an oxygen-flowing amount adjuster for adjusting an amount of oxygen to be supplied to the fuel cell.

19. The fuel cell system according to claim 18,
wherein the evaporation amount of water in the fuel cell is increased by increasing at least one of a hydrogen amount using the hydrogen-flowing amount adjuster, and an oxygen amount using the oxygen-flowing amount adjuster.

20. The fuel cell system according to claim 13, further comprising
a water amount controller for controlling a water amount in the fuel cell,
wherein the water amount controller increases the water amount in the fuel cell before the evaporation amount of water in the fuel cell is controlled by the evaporation amount controller.

* * * * *